Feb. 2, 1954  G. P. GRUMBLY  2,667,846
FLAVOR INJECTION UNIT FOR FROZEN DESSERT MACHINES
Filed Sept. 2, 1949  2 Sheets-Sheet 1
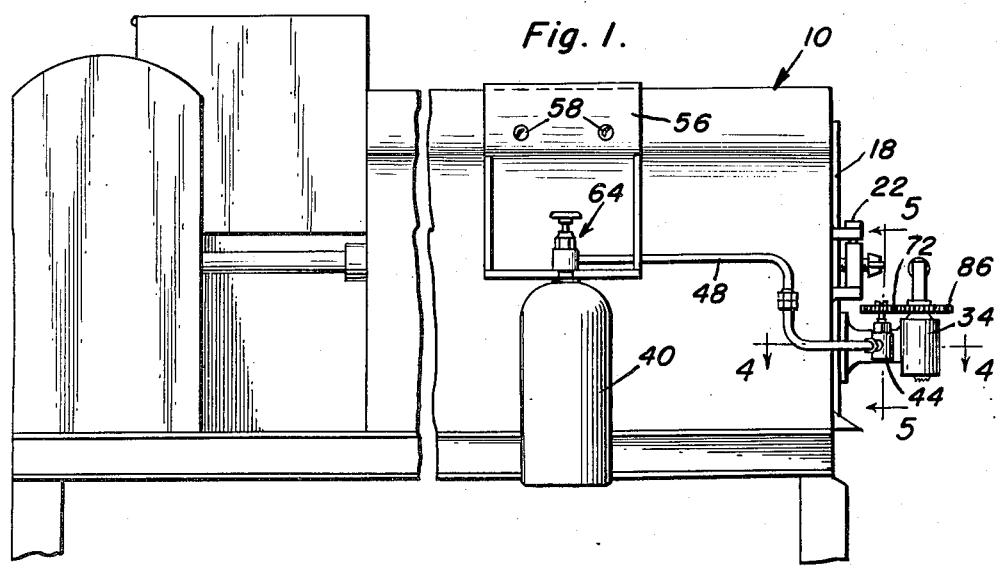
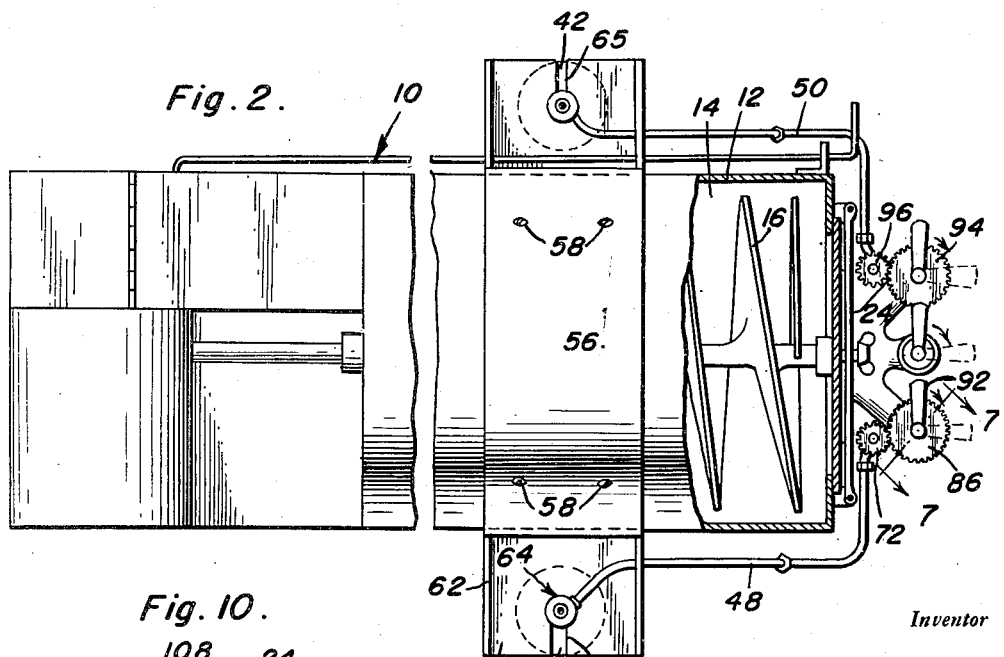
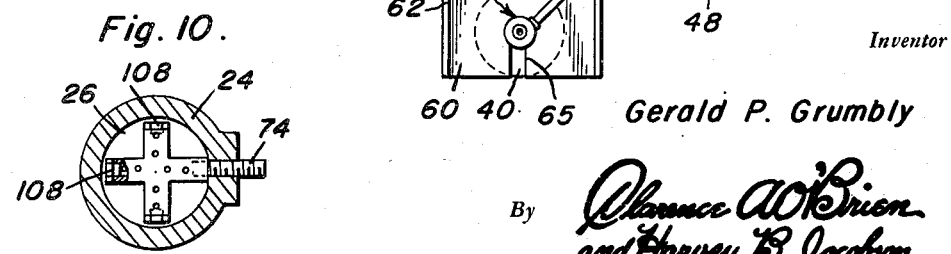
Inventor
Gerald P. Grumbly

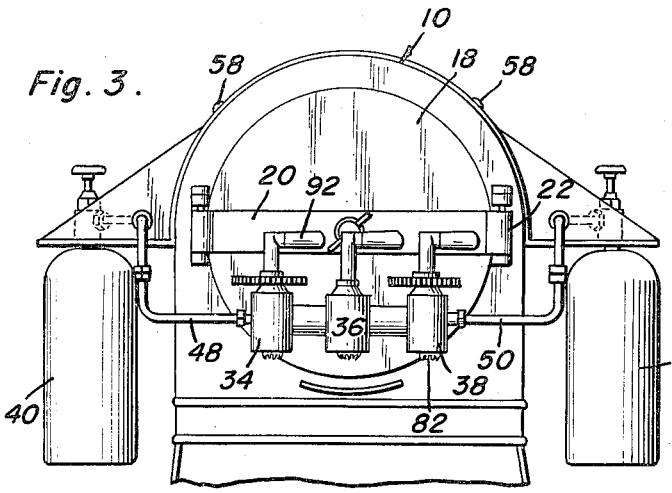
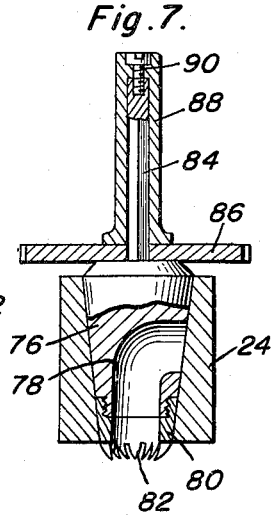
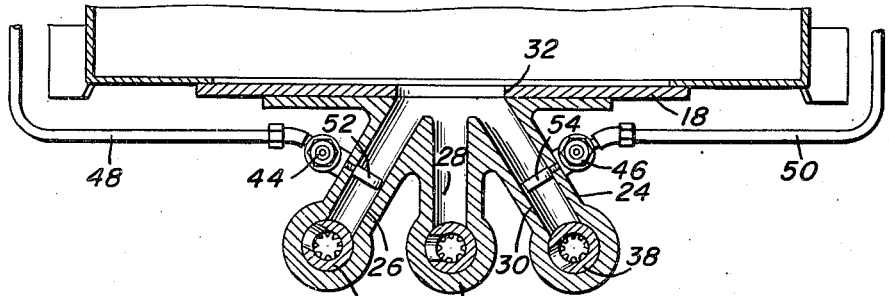
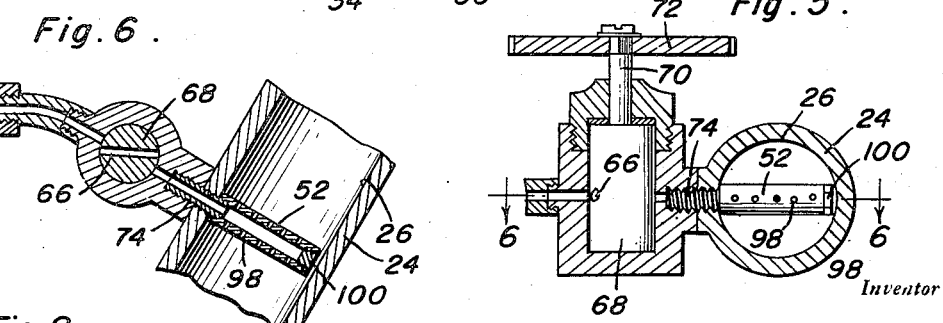
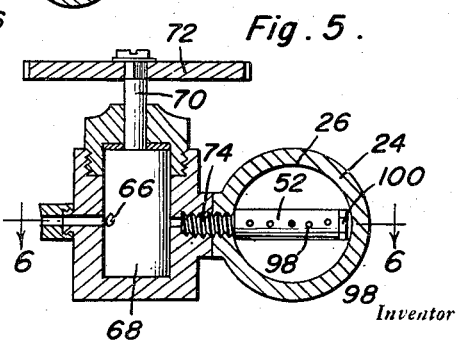
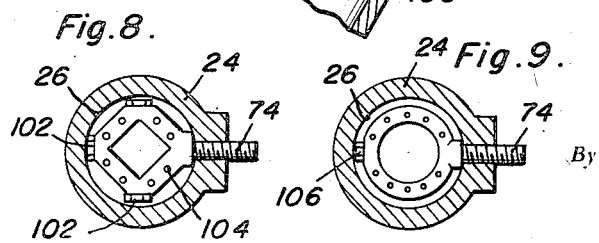

Patented Feb. 2, 1954

2,667,846

UNITED STATES PATENT OFFICE 2,667,846

FLAVOR INJECTION UNIT FOR FROZEN DESSERT MACHINES

Gerald P. Grumbly, West Palm Beach, Fla.

Application September 2, 1949, Serial No. 113,684

5 Claims. (Cl. 107—1)

This invention relates to a dispensing apparatus that injects flavor into a confection as it is being dispensed.

The primary object of this invention is to dispense and flavor material from a common mass without flavoring the common mass.

Another important object of this invention in accordance with the foregoing object is to selectively independently or simultaneously dispense various flavors of material, as well as unflavored material from a common mass of unflavored material.

A further object is to flavor and color the article being dispensed so as to present a final product of predetermined blended or mottled appearance.

A meritorious feature of the present invention resides in the provision of a manifold assembly whereby the confection being dispensed is separated from a single to a plurality of streams for separate flavors.

Another important feature resides in the provision of means for metering the flavoring material to the confection being dispensed in predetermined proportions.

A final important feature to be specifically enumerated herein resides in the provision of injection nozzles for the injection of flavoring and/or coloring material so as to give the final product after being dispensed a blended, mottled or rippled appearance as desired.

These, together with various ancillary features and objects of the invention which will later become apparent as the following description proceeds, are attained by the present invention, a preferred embodiment of which has been illustrated by way of example only in the accompanying drawings, wherein:

Figure 1 is a side elevational view of an embodiment of the present invention showing the same applied to a frozen confection machine with parts being broken away;

Figure 2 is a top plan view of an embodiment of the present invention as applied in Figure 1, parts being broken away and alternate valve positions being shown in dotted outline;

Figure 3 is a front elevational view of an embodiment of the present invention as applied in Figures 1 and 2, portions of the flavoring material introducing means being shown in dotted outline;

Figure 4 is an enlarged horizontal sectional view through the outlet means being taken substantially upon the plane of the section line 4—4 of Figure 1;

Figure 5 is a vertical sectional detail view of an inlet valve and a suitable form of injector nozzle being taken substantially upon the plane of the section line 5—5 of Figure 1;

Figure 6 is a horizontal sectional view of the detail shown in Figure 5, being taken substantially upon the plane of the section line 6—6 of Figure 5;

Figure 7 is a vertical sectional detail view of the discharge control valve, being taken substantially upon the plane of the section line 7—7 of Figure 2;

Figure 8 is a transverse sectional view of a discharge passage showing therein a suitable modification of the injector nozzle shown in Figures 5 and 6;

Figure 9 is a sectional view similar to Figure 8 showing another suitable form of injector nozzle; and Figure 10 is a sectional view similar to Figure 8 showing yet another suitable modification of injector nozzle.

Reference is now made more specifically to the accompanying drawings, wherein like numerals designate similar parts throughout the various views, and in which a conventional frozen confection machine is indicated generally by the numeral 10. The machine 10 includes a barrel 12, a freezing chamber 14 in the barrel 12, and a feeding screw 16. A cover plate 18 is removably secured over the open end of the barrel 12 by a cross bar 20 and fasteners 22.

All of the foregoing structure is of conventional design and further explanation is believed to be unnecessary and is illustrated for the purpose of showing one manner in which the invention to be presently described may be applied.

Suitably secured to the plate 18 is a manifold 24 which is provided with discharge passages 26, 28 and 30. The discharge passages are preferably forwardly diverging and extend from an opening 32 in the plate 18 with which they register. It will thus be seen that the screw 16 will urge semi-frozen confection from the chamber 14 through the opening 32, whereupon the confection will be divided into separate streams and in discharge passages 26, 28 and 30. The discharge passages 26, 28 and 30 are provided with control valves 34, 36 and 38, respectively.

In the embodiment illustrated it will be seen in Figure 4 that the discharge passages 26 and 30 are provided with means for the injection of flavoring or coloring material. These means comprise sources of flavoring material such as bottles 40 and 42 which respectively communicate to the inlet valves 44 and 46 through suitable conduits 48 and 50. The inlet valves 44 and 46 are, in turn, connected to injector nozzles 52 and 54 which are disposed in the discharge passages 26 and 30.

In the preferred construction the bottles 40 and 42 are supported on the machine 10 by a saddle 56 which is suitably secured to the machine 10 as at 58. The saddle 56 is substantially U-shaped and is seated over the machine 10 as shown in Figures 1–3. The saddle 56 includes a pair of horizontal outwardly extending plates 60 which are reinforced by flanges 62.

As it is necessary to supply flavoring material under pressure in order to inject the same into the discharge passages of the manifold 24 and since relatively small amounts of flavoring material are required, the bottles 40 and 42 are preferably of the pressure type of common commercial manufacture employing carbon-dioxide cartridges for pressurization and are provided with regulating valves 64. It will be understood, however, that any suitable flavoring material receptacle could be employed with a small pump for causing the flow of flavoring material therefrom. In the preferred construction utilizing the pressure bottles, the bottles may be conveniently supported by the saddle 56 by seating the valves 64 on the edges of slots 65 provided in the plates 60. It will be understood that the valves 64 are of known types of valves whereby flavoring material is expelled from the pressure bottles under constant pressure.

As shown in Figures 5 and 6, the valve 44 is preferably of the rotary type having a transverse opening 66 in the valve body 68 for selectively aligning the inlet and outlet ports of the valve upon rotation of the valve stem 70. The valve stem 70 has suitably secured to its upper end a gear 72 for a purpose to be later set forth.

The outlet port of the valve 44 communicates through a nipple 74 with the injector nozzle 52, which as previously set forth is disposed in the discharge passage 26. The nipple 74 threadingly engages the nozzle 52 and the valve 44, so that the valve 44 and the nozzle 52 may be removed from the manifold 24. It will be understood that the valve 46 will be of similar construction and disposed for the injection of flavoring material into the discharge passage 30.

As shown in Figure 7, the valve 34 is also of the rotary type and in which the valve body 76 is preferably frusto-conical in shape and is provided with an angle passage 78 for vertical discharge therefrom. In the preferred construction, the valve body 76 has threaded to its lower end a discharge nozzle 80 having a plurality of inturned teeth portions 82 which extend below the surface of the manifold 24 for forming longitudinal ridges in the semi-frozen confection dispensed from the valve 34. Suitably secured to the valve stem 84 in a non-rotatable manner is a gear 86, as by the square valve stem 84 extending through a corresponding square aperture in the gear 86, the gear 86 being retained in position by a cap 88 and fastener 90. Laterally extending from the upper portion of the cap 88 is a handle 92 for manipulation of the valve 34. It will be understood that valve 38 is identical with valve 34, and that valve 36 is substantially the same with the gear 86 omitted.

As best shown in Figure 2, the gears 72 and 86 are in mesh so that manipulation of the handle 92 will simultaneously operate both valve 34 and valve 44, it being understood that the valves are so designed that a proportionate quantity of flavoring material will be injected through the injector nozzle 52 into the stream of semi-frozen confection passing through the discharge passage 26 throughout the full range of the valves' operation.

From the foregoing it will be readily apparent that when the valves 38 and 46 are also interconnected as by gears 94 and 96 and bottles 40 and 42 are filled with different flavoring materials that unflavored material may be dispensed through the valve 36 from the chamber 14 while different flavors may be independently or simultaneously removed through valves 34 and 38. Thus, for example, a neutral flavor, such as vanilla, may be removed from the valve 36 while chocolate may be obtained from the valve 34 and strawberry from the valve 38. It is contemplated that numerous combinations of manifold assemblies may be employed and not merely the relatively simple arrangements illustrated in the drawings.

As shown in Figures 5 and 6, the injector nozzle 52 consists essentially of a straight tube having discharge orifices 98 therein, being provided at one end with a screw-threaded clean-out plug 100 and threadingly receiving the nipple 74 at the other end. Figures 8–10 illustrate other suitable forms of injector nozzles, it being necessary or highly desirable to produce mottled or rippled effects in the appearance of the confection being dispensed from the apparatus. In addition to producing different intermixing effects between the flavoring material and the semi-frozen confection, the different shapes of injector nozzles shown offer a choice of a nozzle which will offer a desired amount of resistance to the flow of confection in view of the consistency of the same in a semi-frozen state.

The injector nozzle shown in Figure 8 is of diamond-shape, being provided with clean-out plugs 102 at three of the apices and is also provided with discharge orifices 104. The injector nozzle shown in Figure 9 is fundamentally similar to that shown in Figure 8, in that confection is free to flow through the center of the nozzle, however, the nozzle is round and is provided with a single clean-out plug 106. Illustrated in Figure 10 is an injector nozzle of cross shape, which is provided at three of its arms with clean-out plugs 108.

It will readily be appreciated that the embodiment of the invention illustrated and described, in addition to having the distinctive feature of providing means whereby separate flavors of a single confection may be dispensed from a common mass of unflavored confection, provides a construction which may be readily disassembled and cleaned and then reassembled. This is considered an especially noteworthy feature in consideration of the sanitation considerations involved in the handling or preparation of foods. It is especially to be noted that each modification of the injector nozzles embodies clean-out plugs whereby the nozzles may be readily cleaned. It is further to be noted that the embodiment illustrated in the drawings may be readily applied to existing confection machines, thereby avoiding unnecessary expense in the utilization of the advantages of this invention and thereby lending greater utility to the invention.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A semi-frozen confection flavoring and dispensing apparatus comprising receptacle means for a confection, outlet means for said receptacle means, and means for introducing flavoring material into said outlet means, said outlet means including means for controlling the flow of confection therefrom and means for regulating the amount of flavoring material introduced therein, means operatively connecting said controlling means and said regulating means for proportioning the amount of introduced flavoring material to the amount of flow of confection through said outlet means, said outlet means including a manifold assembly having a discharge passage communicating with said receptacle means, said manifold being provided with an inlet communicating between said introducing means and said passage, said controlling means including a first control valve for said passage, said regulating means including a second control valve for said inlet, said proportioning means including means interconnecting said first and second valves for simultaneous proportionate operation.

2. The combination of claim 1, wherein said manifold is provided with a second discharge passage in communication with said first mentioned passage and a third control valve therefor.

3. A semi-frozen confection flavoring and dispensing apparatus comprising receptacle means for a confection, outlet means for said receptacle means, and means for introducing flavoring material into said outlet means, said outlet means including a manifold assembly having a discharge passage communicating with said receptacle means, said manifold being provided with an inlet communicating between said introducing means and said passage, said inlet including an injector nozzle disposed in said passage and having a plurality of discharge orifices terminating in a transverse plane for discharging flavoring material into the semi-frozen confection, said discharge orifices for discharging flavoring material adjacent opposite sides of said passage, and said nozzle being provided with a clean-out opening and a removable plug therefor positioned opposite the inlet port of said nozzle.

4. For use with a frozen confection machine of the type having a housing with a confection chamber therein, a flavoring and dispensing attachment comprising a manifold assembly mountable on said housing and having passages for communicating with the chamber to discharge the contents thereof, means for controlling confection flow through each of said passages, means for injecting flavoring material into said passages, a saddle for mounting astride the housing, flavoring material receptacles carried by said saddle, means for conducting flavoring material from said receptacles to said injection means, and means for proportioning the quantity of flavoring material injected into each of passages to the quantity of confection discharged therefrom.

5. In frozen confection dispensing apparatus, a dispensing manifold having an inlet opening for receiving a semi-frozen confection thereinto, said manifold having a pair of discharge passages communicating with the inlet opening, an injection nozzle in at least one of the passages, a valve for controlling the flow of material through each of the passages, a further valve for controlling the flow of material through the injection nozzle, and means interconnecting the further valve and the valve associated with the passage in which the nozzle is disposed for common actuation.

GERALD P. GRUMBLY.

References Cited in the file of this patent

UNITED STATES PATENTS

| Number | Name | Date |
|---|---|---|
| 1,568,660 | Dumas | Jan. 5, 1926 |
| 2,125,729 | Kretchmer | Aug. 2, 1938 |
| 2,284,651 | Gundlach et al. | June 2, 1942 |
| 2,313,060 | Friedman | Mar. 9, 1943 |
| 2,316,165 | Howser | Apr. 13, 1943 |
| 2,344,901 | Routh | Mar. 21, 1944 |
| 2,347,083 | Connellee et al. | Apr. 18, 1944 |
| 2,531,127 | Hershey et al. | Nov. 21, 1950 |